(12) United States Patent
Yang et al.

(10) Patent No.: US 12,314,640 B1
(45) Date of Patent: May 27, 2025

(54) METHODS AND SYSTEMS FOR MODELLING SURFACE-BASED CONSTRAINTS IN FINITE ELEMENT ANALYSIS MODEL

(71) Applicant: ANSYS, Inc., Canonsburg, PA (US)

(72) Inventors: Hankang Yang, Bridgeville, PA (US); Yongyi Zhu, Venetia, PA (US); Yong-Cheng Liu, Pittsburgh, PA (US)

(73) Assignee: ANSYS, INC., Canonsburg, PA (US)

( * ) Notice: Subject to any disclaimer, the term of this patent is extended or adjusted under 35 U.S.C. 154(b) by 951 days.

(21) Appl. No.: 17/408,013

(22) Filed: Aug. 20, 2021

Related U.S. Application Data

(60) Provisional application No. 63/177,235, filed on Apr. 20, 2021.

(51) Int. Cl.
*G06F 30/23* (2020.01)
*G06F 17/16* (2006.01)
*G06F 111/04* (2020.01)
*G06F 119/14* (2020.01)

(52) U.S. Cl.
CPC .............. *G06F 30/23* (2020.01); *G06F 17/16* (2013.01); *G06F 2111/04* (2020.01); *G06F 2119/14* (2020.01)

(58) Field of Classification Search
CPC ...... G06F 30/23; G06F 17/16; G06F 2111/04; G06F 2119/14
See application file for complete search history.

(56) References Cited

PUBLICATIONS

Abaqus 6.12 Analysis User's Manual vol. V: Prescribed Conditions, Constraints & Interactions. 2012. Dassault Systèmes Simulia Corp. (Year: 2012).*

Aminpour, M. A., Ransom, J. B., & McCleary, S. L. A coupled analysis method for structures with independently modelled finite element subdomains. 1995. International Journal for Numerical Methods in Engineering, 38(21), 3695-3718. (Year: 1995).*

Siswanto, W. A., & Darmawan, A. S. Teaching finite element method of structural line elements assisted by open source FreeMat. 2012. Research Journal of Applied Sciences, Engineering and Technology, 4(10), 1277-1286. (Year: 2012).*

(Continued)

*Primary Examiner* — Ryan F Pitaro
*Assistant Examiner* — Hein Jeong
(74) *Attorney, Agent, or Firm* — Douglas A. Gastright

(57) ABSTRACT

A model representing a physical object is received. The model contains a pilot node, one or more surface nodes, and a constraint for coupling displacements/movements of the pilot node with the one or more surface nodes via a set of constraint equations. The pilot node is subject to a condition that restricts node swapping for resolving node dependency in elimination method. An internal node is created based on the pilot node. The internal node and the pilot node occupy a same location initially. The internal node and the one or more surface nodes are constrained via the set of constraint equations. The model is modified with the internal node and a numerical spring connecting the pilot node and the internal node. The numerical spring is configured for limiting relative movements between the pilot node and the internal node. Physical behaviors of the physical object are simulated using the modified model.

18 Claims, 18 Drawing Sheets

(56) References Cited

PUBLICATIONS

Garoz, D., Gilabert, F. A., Sevenois, R. D. B., Spronk, S. W. F., & Van Paepegem, W. Consistent application of periodic boundary conditions in implicit and explicit finite element simulations of damage in composites. 2019. Composites Part B: Engineering, 168, 254-266. (Year: 2019).*

Chen, J., Jiao, Y., Jiang, W., & Zhang, Y. Peridynamics boundary condition treatments via the pseudo-layer enrichment method and variable horizon approach. 2021. Mathematics and Mechanics of Solids, 26(5), 631-666. (Year: 2021).*

Refachinho de Campos, P. R., & Gay Neto, A. (2018). Rigid body formulation in a finite element context with contact interaction. Computational Mechanics, 62, 1369-1398. (Year: 2018).*

* cited by examiner

Local x-axis
(subscript 1) as the
axis of rotation

Local z-axis
(subscript 3) as the
axis of rotation

I, J – Coincident Nodes

Local x-axis (superscript 1) as the axis of cylindrical joint

Local z-axis (superscript 3) as the axis of cylindrical joint

METHODS AND SYSTEMS FOR MODELLING SURFACE-BASED CONSTRAINTS IN FINITE ELEMENT ANALYSIS MODEL

CROSS-REFERENCE TO RELATED APPLICATIONS

This application claims benefits of U.S. Provisional Patent Application Ser. No. 63/127,235 for "Methods And Systems For Resolving Surface-Based Constraints In Finite Element Modelling", filed Apr. 20, 2021. The contents of which are hereby incorporated by reference in its entirety for all purposes.

FIELD

The subject matter described herein relates to computer-aided engineering analysis (CAE), more particularly to methods and systems for modelling surface-based constraints in finite element analysis model.

BACKGROUND

Surface-based constraints are widely used in industrial simulations. Displacements/movements of a pilot node or reference node can be coupled with one or more nodes on a surface (i.e., surface nodes) or vice versa by a constraint (i.e., a surface-based constraint). The surface-based constraint can be constrained kinematically (e.g., rigid constraint) or kinetically (e.g., force-distributed constraint) via a respective set of constraint equations. Occasionally it suffers from over-constraint.

In a rigid constraint, the pilot node is independent while each surface node is dependent. In a force-distributed constraint, the pilot node is dependent while each surface node is independent. One of the prior art approaches to resolve over-constraint has been using elimination method by swapping or interchanging independent node with dependent node internally. However, in certain situations, swapping cannot be performed (e.g., both dependent node and independent node are subject to other constraints and/or boundary conditions).

For example, when both pilot node and surface node are connected to a joint element associated with Lagrange multipliers (LM) and/or structural boundary conditions, node swapping technique cannot be used hence an over-constrained condition. The over-constrained condition may cause difficulties and/or instabilities in solution convergence in simulations using a model containing such a constraint.

SUMMARY

A surface-based constraint includes a set of nodes in a finite element analysis model with one node identified or designated as a pilot node (or reference node) and others as surface node or nodes (i.e., one or more nodes on a surface). Surface-based constraint can be used for coupling displacements/movements of the pilot node with one or more surface nodes.

In one aspect, a model representing a physical object is received in a computer system. The model contains a pilot node, one or more surface nodes, and a constraint for coupling displacements/movements of the pilot node with the one or more surface nodes via a set of constraint equations. When the pilot node is subject to a condition that restricts node swapping for resolving node dependency in elimination method. An internal node is created based on the pilot node. The internal node and the pilot node occupy a same location initially. The internal node and the one or more surface nodes are constrained via the set of constraint equations. The model is modified with the internal node and a numerical spring connecting the pilot node and the internal node. The numerical spring is configured for limiting relative movements between the pilot node and the internal node within a tolerance. Physical behaviors of the physical object are simulated using the modified model.

In another aspect, the condition that restricts node swapping for resolving node dependency in elimination method can include displacement boundary condition and/or another constraint (e.g., a joint element associated with Lagrange Multipliers).

In yet another aspect, values of the stiffness matrix for the numerical spring are determined based on material properties and a representing length of one or more structural finite elements respectively connected to the pilot node and the surface node. Material properties can be Young's modulus. The representing length can be the shortest dimension of the connected structural finite elements. Values of the stiffness matrix may be adjusted with a numerical procedure during solutions in a simulation. Numerical procedure can be based on augmented Lagrangian method.

In still another aspect, a model representing a physical object is received in a computer system. The model contains a first node, a second node, and a constraint (i.e., a surface-based constraint) for coupling displacements/movements of the first node (i.e., pilot node) with the second node (i.e., surface node) via a set of constraint equations. There are two types of surface-based constraints: rigid and force-distributed. It contains at least one surface node in a rigid constraint. There are more than one surface nodes in a force-distributed constraint. A third node (i.e., internal node) is created based on the first node. The third node and the first node occupy a same location initially. The third node and the second node are constrained via the set of constraint equations. The model is modified with the third node and a numerical spring connecting the first node and the third node. The numerical spring is configured for limiting relative movements between the first node and the third node within a tolerance. Physical behaviors of the physical object are obtained in a simulation using the modified model. The simulation contains performing an elimination method to resolve node dependency based on node swapping. The node swapping can be restricted by a boundary condition associated with a node. The node swapping can also be restricted by another constraint imposed on a node, for example, a displacement constraint imposed on a node of a joint element, which is associated with Lagrange Multipliers.

DETAILED DESCRIPTION

Systems and methods are disclosed to resolve node dependency in a surface-based constraint in a model (e.g., finite element analysis model) thus improving solution convergence and stability in a simulation. Surface-based constraint is configured for coupling movements/displacements of a pilot node with one or more surface nodes via a set of constraint equations. The disclosed mechanism can generate or create an internal node (i.e., pseudo node) based on the pilot node. The internal node and the pilot node occupy a same location initially. A set of constraint equations can be generated between the internal node, and the one or more surface nodes. The model is modified by connecting the pilot node and the internal node with a numerical spring. Stiffness values of the numerical spring are based on material properties and a representing size of respectively connected structural finite elements to the pilot node and the surface node. The stiffness values are so configured that physical characteristics of the model are substantially unaltered, for example, within a tolerance. Physical characteristics can include relative movements/displacements between the pilot node and the internal node. Furthermore, a numerical procedure (e.g., augmented Lagrangian method) is used for limiting the relative movements/displacements between the pilot node and the internal node in a simulation, thereby assuring the numerical spring stiffness values are adequate to avoid ill-condition.

Figure 1A:
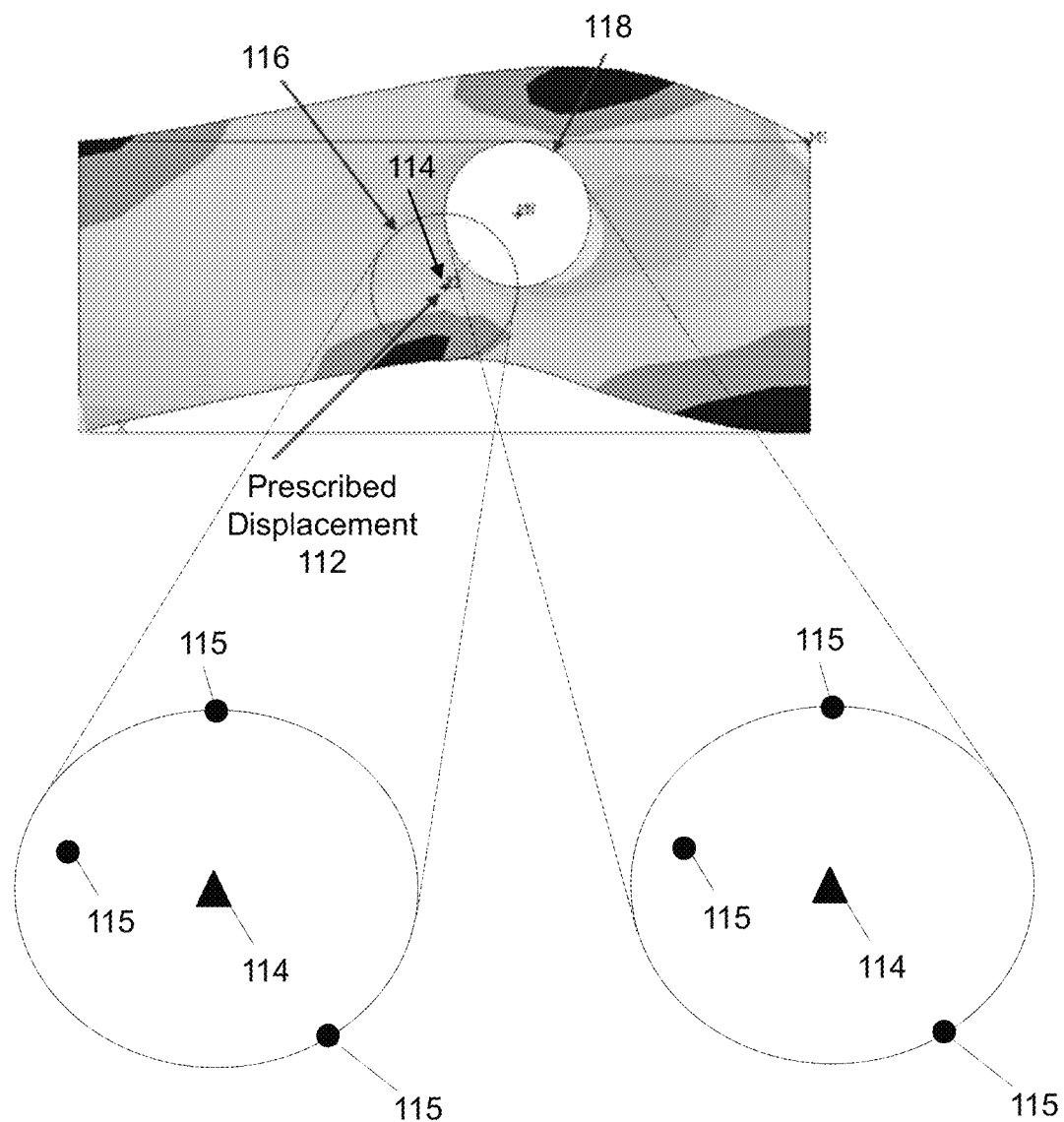
FIG. 1A is a diagram depicting an example rigid constraint.

There are two types of surface-based constraints: rigid constraint and force-distributed constraint. FIG. 1A is a diagram showing an example rigid constraint between a pilot node 114 and surface nodes 115 located on an initial surface (i.e., first circular disk 116). The rigid constraint is built based on kinematic to preserve the surface shape. For example, when a prescribed displacement 112 is applied at the pilot node 114, surface nodes 115 located on a first circular disk 116 (initial surface) are moved to a second circular disk 118 (current surface). Through the rigid constraint, the second circular disk 118 maintains the same shape of the first circular disk 116. Each surface node 115 remains in the same relative orientation after the prescribed displacement 112 is applied.

For a rigid constraint, the pilot node 114 is an independent node while each surface node 115 is a dependent node in an elimination method. To couple displacements/movements of the pilot node 114 and each surface node 115, a set of constraint equations is used as follows:

$$\vec{x}_s = \vec{x}_m + \tilde{R}_m \tilde{\rho}_0$$

$$\vec{\theta}_s = \vec{\theta}_m$$

where:

$\vec{x}_m$ is a translational displacement vector for the pilot node.

$\vec{x}_s$ is a translational displacement vector for a surface node.

$\tilde{R}_m$ is a rotational matrix between the pilot node and the surface node.

$\vec{\rho}_0$ is the initial distance vector between the pilot node and the surface node.

$\vec{\theta}_m$ is a rotational displacement vector for the pilot node.

$\vec{\theta}_s$ is a rotational displacement vector for the surface node.

Figure 1B:
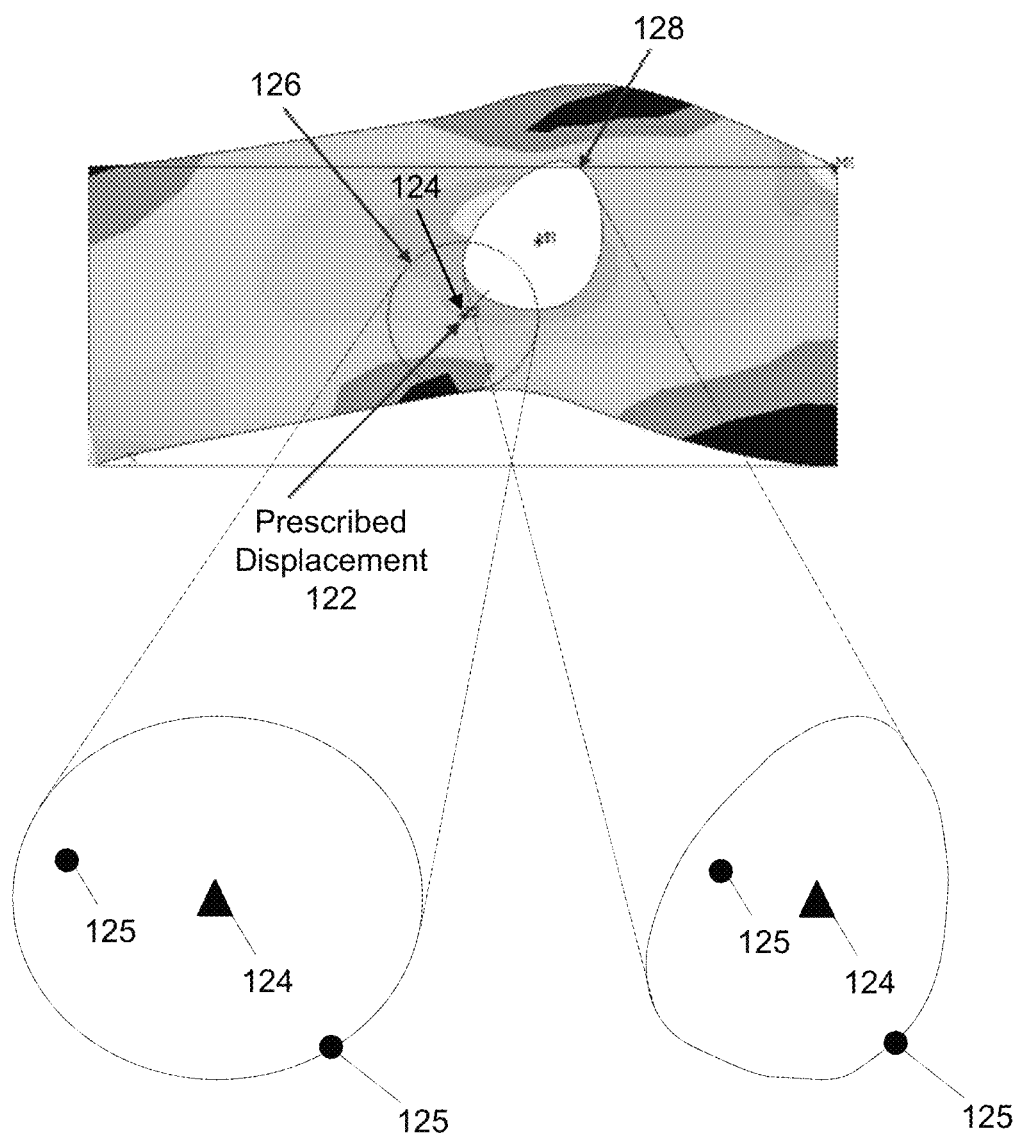
FIG. 1B is a diagram depicting an example force-distributed constraint.

An example force-distributed constraint is shown in FIG. 1B. Force-distributed constraint is built based on kinetic to distribute internal forces and moments but not necessarily to preserve the surface shape. For example, when a prescribed displacement 122 is applied to the pilot node 124, two or more surface nodes 125 located initially on a surface with a circular shape 126 are moved to a deformed surface 128. (i.e., non-circular shape).

In a force-distributed constraint, the pilot node 124 is a dependent node. Each of the two or more surface nodes 125 is an independent node. To couple displacements/movements of the pilot node 124 and the surface nodes 125, a set of constraint equations is used as follows:

$$\vec{x}^P = \Sigma w^n \vec{x}^n + \tilde{T}^{-1} \Sigma w^n (\vec{r}^n \times \vec{x}^n) \times \vec{r}^P$$

$$\vec{\theta}^P = \tilde{T}^{-1} \Sigma w_n (\vec{r}_n \times \vec{x}^n)$$

$$\tilde{T} = \Sigma w^n [\vec{r}^n \cdot \vec{r}^n] I - \vec{r}^n \otimes \vec{r}^n]$$

where:

$\vec{x}^P$ is a translational displacement vector for the pilot node.

$\vec{x}^n$ is a translational displacement vector for the n-th surface node.

$\vec{r}^P$ is a distance vector from the center of geometry of weighted surface nodes to the pilot node.

$\tilde{T}$ is an inertia tensor based on weighted surface nodes.

$w^n$ is weight for the n-th surface node.

$\vec{r}^n$ is a distance vector from the center of geometry of weighted surface nodes to the n-th surface node.

$\vec{\theta}^P$ is a rotational displacement vector for the pilot node.

For either surface-based constraint, surface nodes can be located anywhere on a surface. The pilot node does not need to be located on the same surface. The surface can be flat or curved. In an elimination method for resolving node dependency in a constraint (e.g., surface-based constraint), stiffness terms for a dependent node are eliminated and combined with corresponding terms for the corresponding independent node. When performing elimination, dependent node and the corresponding independent node can be interchanged or swapped internally. Node swapping is performed when either node is subject to another constraint condition (e.g., a structural boundary condition, other method of treating a constraint). Structural boundary condition (e.g., displacement boundary condition) can be applied on any node (i.e., pilot or surface node). However, node swapping technique may fail to resolve dependency in certain situations/configuration, for example, both the pilot node and all surface nodes are under structural boundary conditions and/or other constraints.

There are other methods for resolving node dependency in a constraint, for example, Lagrange-multiplier method (or a method of Lagrange Multipliers). Lagrange-multiplier method is generally associated with a joint element, which contains two nodes with a constraint (e.g., a displacement constraint).

Elimination Method

In finite element analysis, elimination method can be used for reducing degrees-of-freedom at dependent node(s). Elimination method is a linear algebra problem of eliminating certain equations out of a set of simultaneous linear equations. The elimination method can be shown in the following example for reducing a 2×2 matrix to a single value. The 2×2 stiffness matrix has four values for DOF a (dependent) and DOF b (independent) as follows:

$$\begin{bmatrix} K_{aa} & K_{ab} \\ K_{ba} & K_{bb} \end{bmatrix}$$

After applying the elimination method for eliminating dependent DOF, the stiffness matrix becomes $$\begin{bmatrix} 0 & 0 \\ 0 & K_{bb}^* \end{bmatrix}$$

Since terms related to dependent DOF a have been eliminated, a surface-based constraint can be represented by only independent node(s). In this example, Kbb represents the remaining stiffness term for the independent DOF b.

Independent DOF b and dependent DOF a can sometimes swapped or interchanged, i.e., DOF b becomes dependent and DOF a becomes independent. As a result, terms related to DOF b would be eliminated instead of terms related to DOF a. Using node swapping or interchanging technique, either node can be treated as dependent node with associated DOFs eliminated.

Lagrange-Multiplier Method

In mathematical optimization, the method of Lagrange Multipliers or Lagrange-multiplier method is a strategy for finding the local maxima and minima of a function subject to equality constraints (i.e., subject to the condition that one or more equations have to be satisfied exactly by the chosen values of the variables). The basic principle is to convert a constrained problem into a form such that the derivative test of an unconstrained problem can still be applied. The relationship between the gradient of the function and gradients of the constraints rather naturally leads to a reformulation of the original problem, known as the Lagrangian function.

The Lagrange-multiplier method can be summarized as follows: in order to find the maximum or minimum of a function $f(x)$ subjected to the equality constraint $g(x)=0$, form the Lagrangian function $L(x, \lambda)=f(x)-\lambda g(x)$ and find the stationary points of L as a function of x and the Lagrange multiplier $\lambda$. The solution corresponding to the original constrained optimization is always a saddle point of the Lagrangian function, which can be identified among the stationary points from the definiteness of the bordered Hessian matrix. The great advantage of Lagrange-multiplier method is to allow the optimization to be solved without explicit parameterization in terms of the constraints.

Figure 2A:
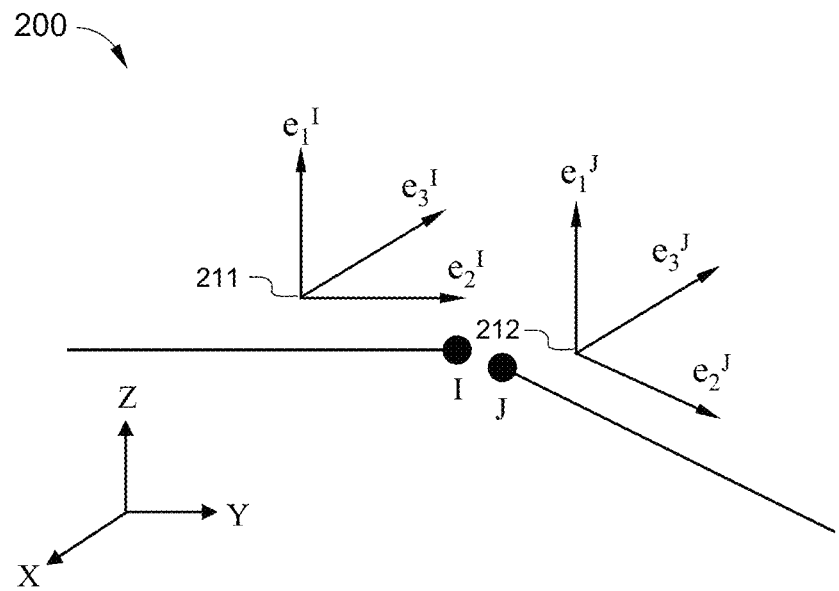
FIG. 2A is a schematic diagram showing a joint element.
Figure 2B:
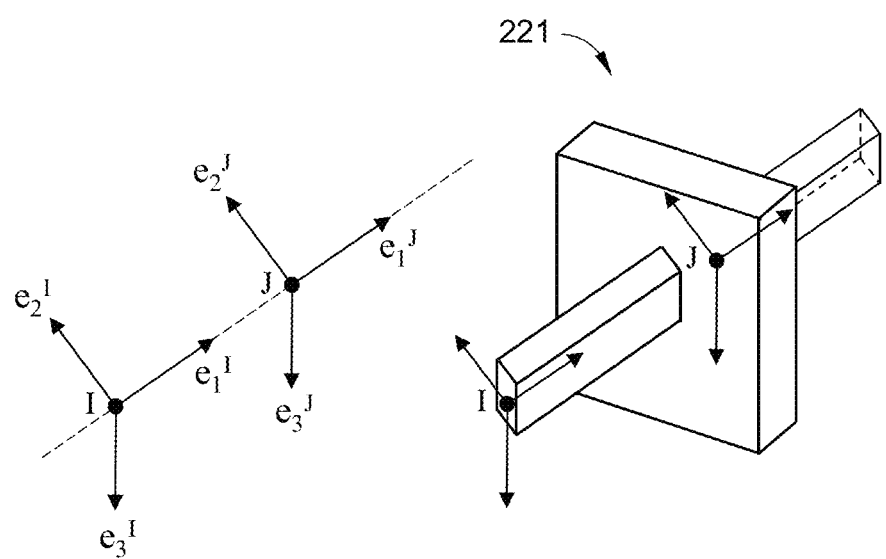
FIGS. 2B-2F are diagrams showing example joint elements.
Figure 2C:
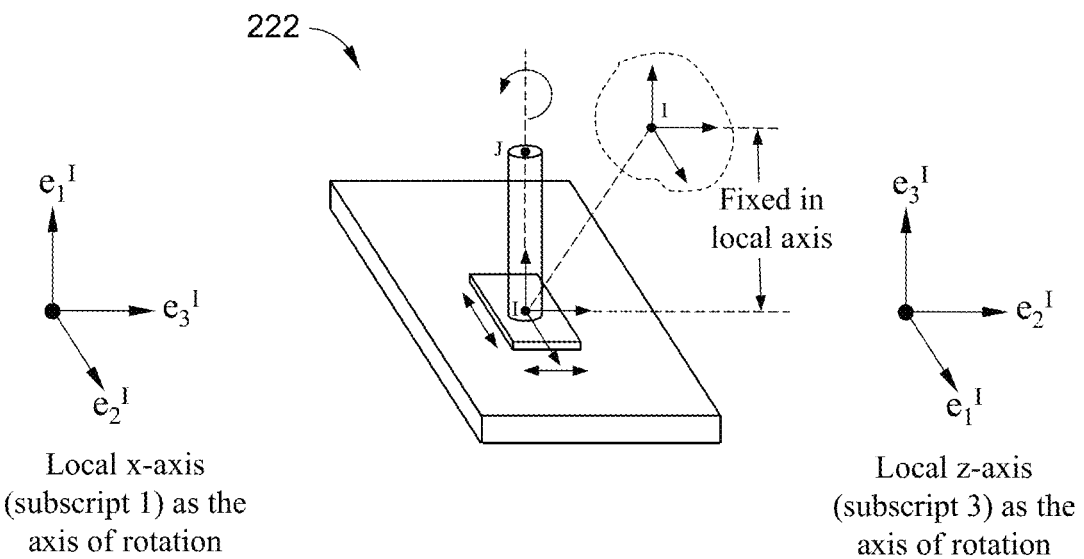
Figure 2D:
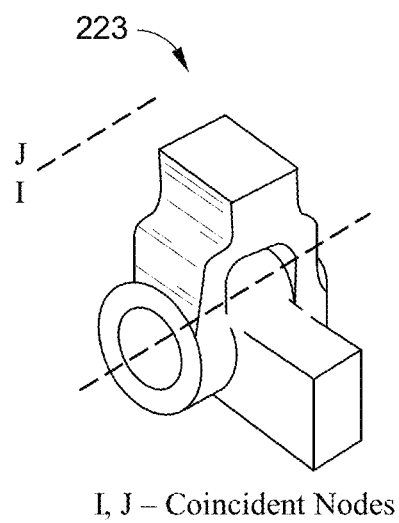
Figure 2E:
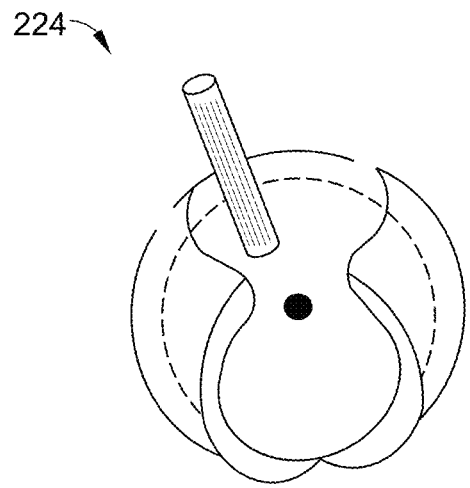
Figure 2F:
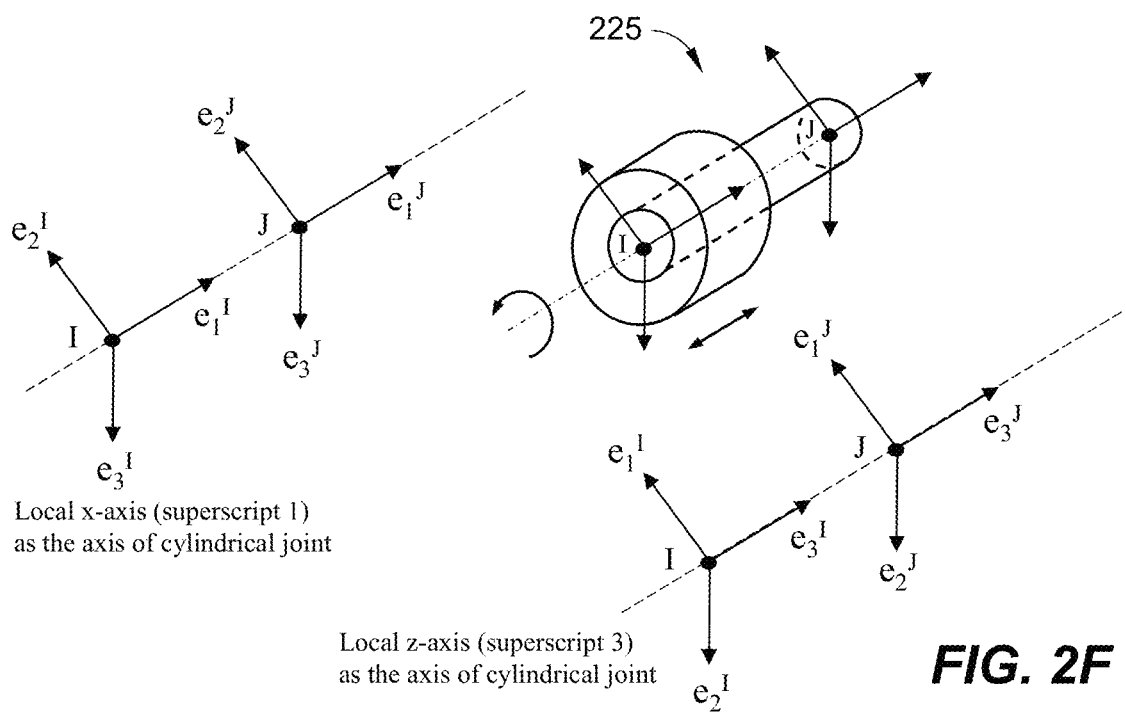

In the finite element analysis, joint elements are used as connection elements. FIG. 2A shows a schematic diagram of a joint element 200. Each joint element consists of two nodes (node I, node J) with orientation defined by respective local coordinate systems 211-212. Two nodes of a joint element are coupled to each other with a constraint (i.e., a joint constraint). Lagrange-multiplier method can be used for resolving dependency of the two nodes of a joint element. Joint elements can include different types. FIG. 2B shows an example translational joint 221, which contains only one released translational DOF. An example planar joint 222 shown in FIG. 2C has two released translational DOFs. FIG. 2D shows an example revolute joint 223 that has one released rotational DOF. An example spherical joint 224 having all rotational DOFs is shown in FIG. 2E. FIG. 2F shows an example cylindrical joint 225 with one released translational DOF and one released rotational DOF.

Finite Element Analysis

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, constraints, etc.) are specified. Boundary conditions can include known displacements at specific degree-of-freedom (DOF). Constraints may be a surface-based constraint for coupling displacements/movements of two nodes in a model. In this fashion a model of the object and its environment is created.

Figure 3A:
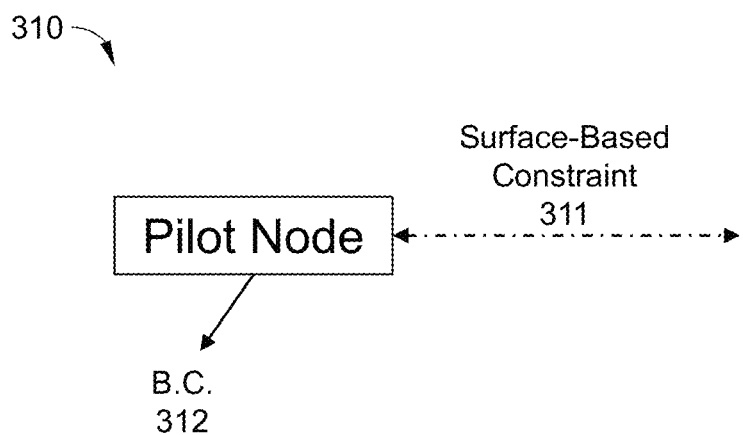
FIGS. 3A-3B are diagrams showing example conditions at the pilot joint of a surface-based constraint that restricts node swapping.
Figure 3B:
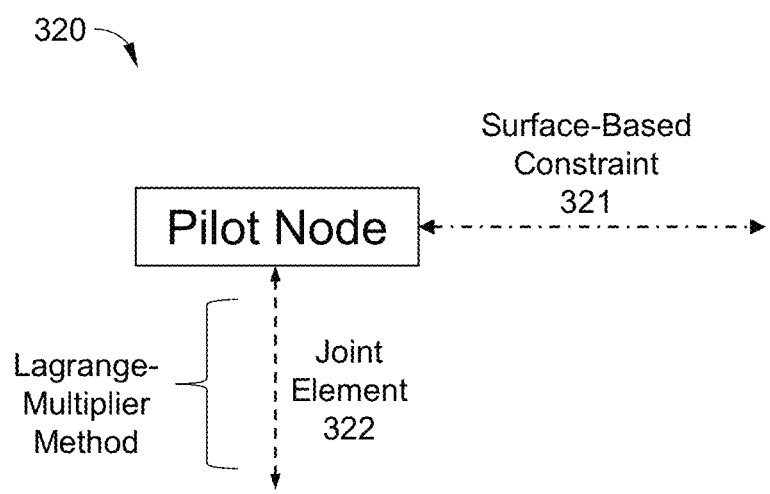

FIGS. 3A-3B show example conditions on a pilot node of a surface-based constraint that restrict node swapping for resolving node dependency in elimination method. In the first example condition 310, the pilot node for a surface-based constraint 311 is subject to a boundary condition 312 (i.e., displacement boundary condition). In the second example condition 320, the pilot node in a surface-based constraint 321 is subject to another constraint 322 (i.e., a joint element associated with Lagrange Multipliers).

When a pilot node is under such a condition (e.g., boundary condition, another constraint), the node swapping can still be done if any surface node is free of these conditions. A surface-based constraint becomes over-constrained when both pilot node and surface nodes are subject to structural boundary and/or other constraints. Four example over-constrained conditions are shown in FIGS. 4A-4D. In the first example over-constrained condition 410 shown in FIG. 4A, a surface-based constraint 411 is connected with a joint element 412 at one end and applied with a boundary condition (B.C.) 414 at the other end. The surface-based constraint 411 can be either a rigid constraint or a force-distributed constraint. The surface-based constraint 411 is for coupling displacements or movements of two nodes—an independent node I and a dependent node D. The boundary condition 414 is applied to the independent node I. The joint element 412 contains two nodes J1 and J2. In this example, the dependent node D is the node J2 of the joint element 412. Lagrange-multiplier method is used for resolving dependency of nodes in the joint element 412. The independent node I and dependent node D can either be a pilot node or a surface node in this example. Because the boundary condition 414 is applied to the independent node I and the joint element 412 is connected to the dependent node D, the node swapping technique cannot be used in this example hence an over-constrained condition. Using elimination method for the surface-based constraint 411 would lose accuracy of numerical representation (e.g., stiffness matrix) of the surface-based constraint 411.

An example demonstrates such a loss of accuracy in stiffness matrix is shown below. Elimination method is used for node a and node b (Node b is a dependent node). Lagrange-multiplier method is used for node b and node c. The 4×4 stiffness matrix is as follows:

$$\begin{bmatrix} K_{aa} & K_{ab} & 0 & 0 \\ K_{ba} & K_{bb} & K_{bc} & (G_b^l)^T \\ 0 & K_{cb} & K_{cc} & (G_c^l)^T \\ 0 & G_b^l & G_c^l & 0 \end{bmatrix}$$

$G_*^l$ is Lagrange-multiplier method contribution to stiffness matrix at node * (Node b or node c). After terms related to node b is eliminated and condensed to $K^*_{aa}$. The stiffness matrix becomes:

$$\begin{bmatrix} K^*_{aa} & 0 & 0 & 0 \\ 0 & 0 & 0 & 0 \\ 0 & 0 & K_{cc} & (G_c^l)^T \\ 0 & 0 & G_c^l & 0 \end{bmatrix}$$

Terms $K_{bc}$, $K_{bc}$, $(G_b^l)^T$, and $G_b^l$ are gone thereby resulting a loss of accuracy.

Figure 4A:
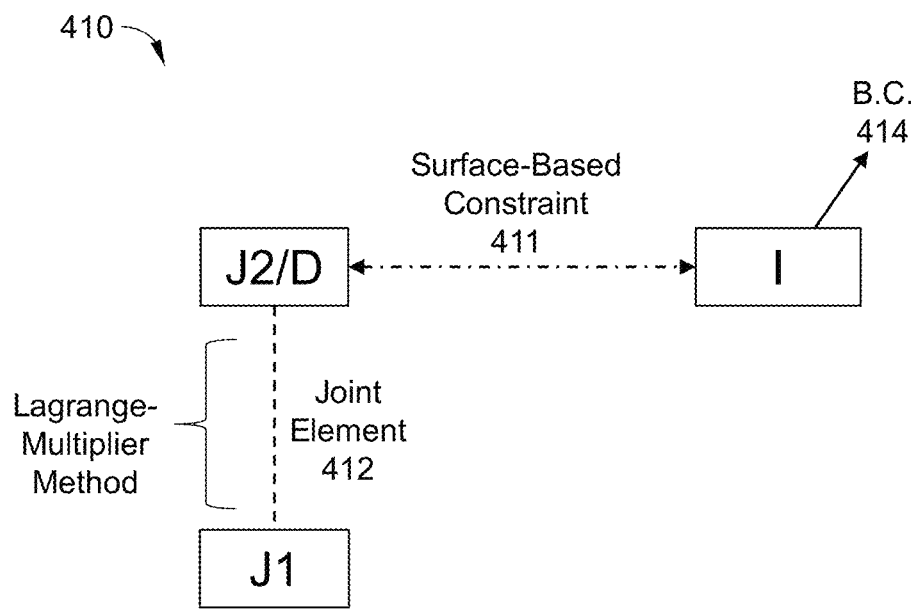
FIGS. 4A-4D are diagrams showing example over-constrained conditions.
Figure 4B:
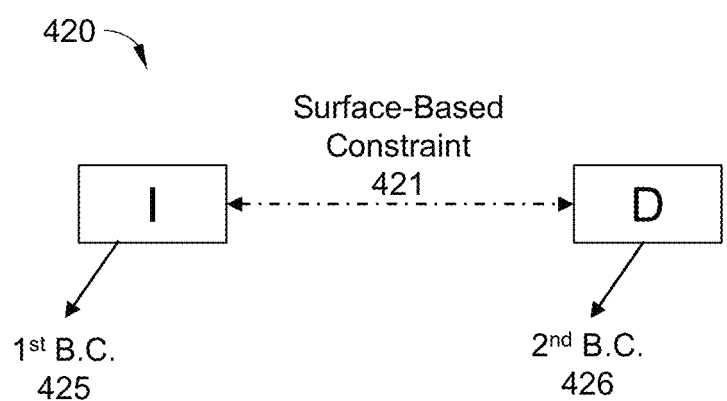

The second example over-constrained condition 420 is shown in FIG. 4B. A surface-based constraint 420 is for coupling movements of an independent node I and a dependent node D. A first boundary condition 425 is applied to the independent node I. A second boundary condition 426 is applied to the dependent node D. As a result, node swapping technique cannot be used in the second example 420. The surface-based constraint 420 can be either a rigid constraint or a force-distributed constraint. The boundary conditions can be a force or displacement boundary condition (i.e., structural boundary condition).

Figure 4C:
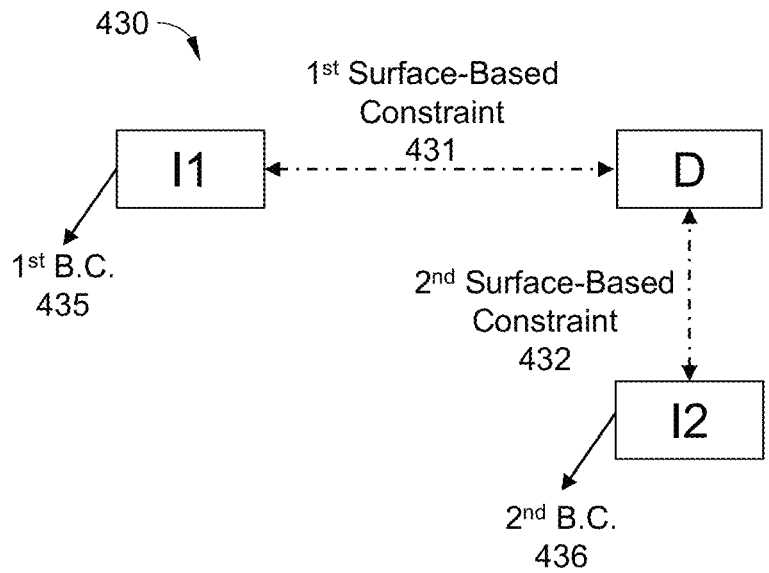

FIG. 4C shows a third example over-constrained condition 430. A first surface-based constraint 431 and a second surface-based constraint 432 are connected at a shared node (i.e., dependent node D). A first boundary condition 435 is applied to the independent node I1 for the first surface-based constraint 431. A second boundary condition 436 is applied to the independent node I2 for the second surface-based constraint 432. Due to the respective boundary conditions, node swapping technique cannot be used.

A stiffness matrix for an example having three nodes that cannot be interchanged/swapped is listed below:

$$\begin{bmatrix} K_{aa} & K_{ab} & 0 \\ K_{bc} & K_{bb} & K_{bc} \\ 0 & K_{cb} & K_{cc} \end{bmatrix}$$

An elimination method is applied to node a and node b (Node b is dependent node). An elimination method is applied to node c and node b (Node b is dependent node). Since the dependent node b cannot be condensed to node a and node c simultaneously, this example contains a conflict resulted in an over-constrained condition.

Figure 4D:
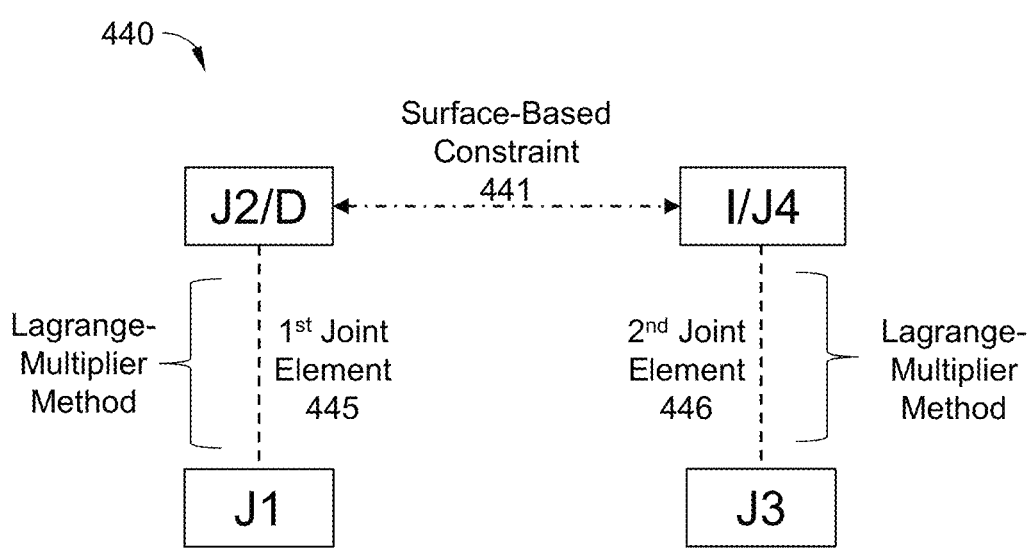

A fourth example over-constrained condition 440 is shown in FIG. 4D. A surface-based constraint 441 is connected to joint elements at either end. The first joint element 445 contains two nodes J1 and J2. Node J2 is the dependent node D for the surface-based constraint 441. The second joint element 446 contains two nodes J3 and J4. Node J4 is the independent node I for the surface-based constraint 441. Since Lagrange-multiplier method is used for resolving respective node dependency in both joint elements, node swapping cannot be performed for nodes of the surface-based constraint 441. Over-constrained condition is the result.

Figure 5:
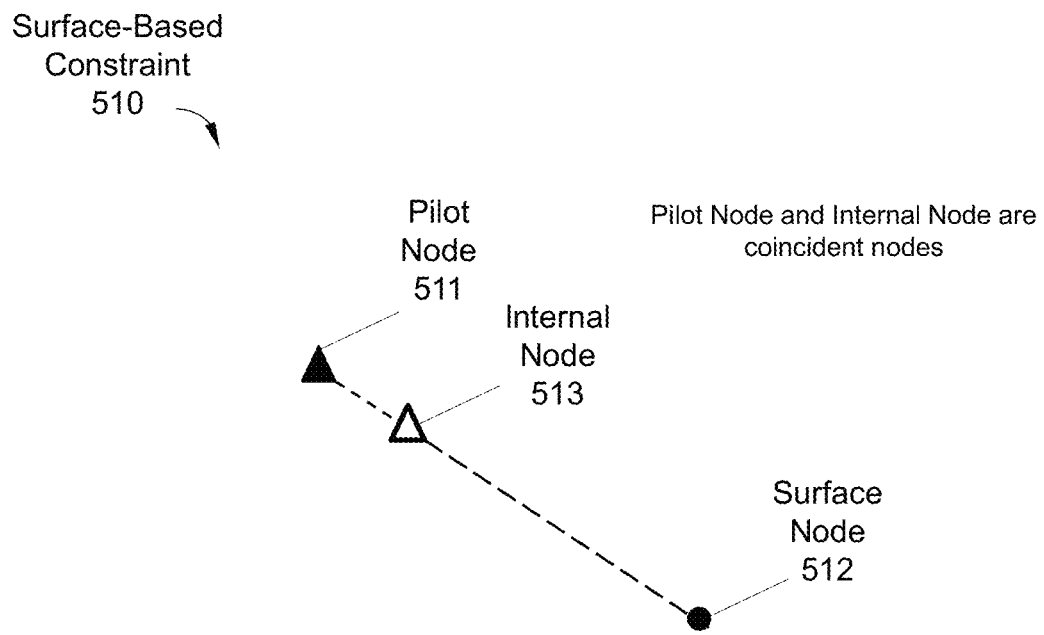
FIG. 5 is a diagram showing an example internal node based on a pilot node.

FIG. 5 shows a diagram of a surface-based constraint 510 with a pilot node 511 and a surface node 512. According to an embodiment of the disclosure, an internal node 513 or pseudo node is created based on the pilot node 511. The internal node 513 and the pilot node 511 occupy a same location in the beginning of a simulation (e.g., a finite element solution). For illustration clarity, the pilot node 511 and the internal node 513 are shown in two locations. Also only one surface node 512 is shown (there can be more than one surface nodes). Since the internal node 513 and the pilot node 511 have the same coordinates initially, a set of constraint equations between the internal node 513 and the surface node 512 (or surface nodes) is exactly the same as the constraint equations between the pilot nodes 511 and the surface node 512 (or surface nodes). Internal node 513 is created for separating the pilot node 511 having a boundary condition or other constraint (e.g., joint element associated with Lagrange-multiplier method) from a surface-based constraint 510. Such a separation allows using elimination method (i.e., eliminating stiffness terms corresponding to the dependent node) to resolve the node dependency of the surface-based constraint 510 easier, because the internal node 513 is not subject to any other constraint or boundary condition. Internal node is a node created internally only for the purpose of separating a pilot node subject to a boundary condition or another constraint. Structural behaviors (e.g., displacements) are not shown in the output of a simulation.

Figure 6:
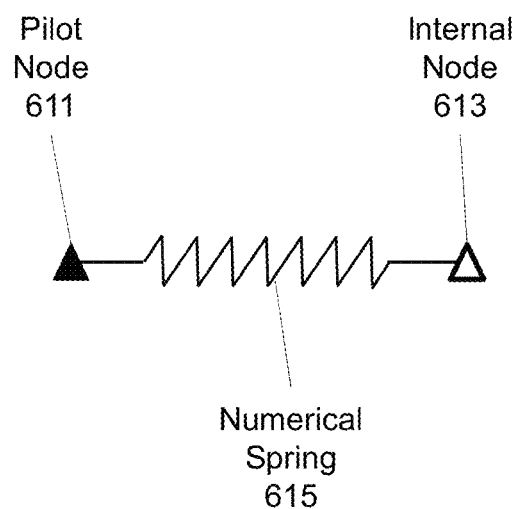
FIG. 6 is a diagram showing an example numerical spring for connecting a pilot node and an internal node.

In order to connect a pilot node 611 and an associated internal node 613, a numerical spring 615 is added in the model as shown in FIG. 6. The numerical spring 615 can be a 2D spring with two translational DOFs and one rotational DOF. The numerical spring 615 can also be a 3D spring with three translational DOFs and three rotational DOFs. The stiffness of the numerical spring is determined based on material properties and representing size (i.e., length) of structural element(s) respectively connected to the pilot node and the surface node. Material properties comprise Young's modulus. The representing length can be the shortest dimension of the connected structural elements.

Young's Modulus

Young modulus, or the modulus of elasticity in tension, is a mechanical property that measures the tensile stiffness of a solid material. It quantifies the relationship between tensile stress (force per unit area) and axial strain (proportional deformation) in the linear elastic region of a material.

The formula used for derived the stiffness is as follows:

$$f = -k(|x^i - x^j| - l_0)n$$

where n is the normal vector between node i and node j.

$$\frac{\partial f}{\partial x} = -k\left((|x^i - x^j| - l_0)\frac{\partial n}{\partial x} + \frac{\partial(|x^i - x^j| - l_0)}{\partial x}n\right) =$$

$$-k\left((|x^i - x^j| - l_0)\left(\frac{I - n \otimes n}{|x^i - x^j|}\right) + n \otimes n\right)$$

where k is spring stiffness, $l_0$ is initial length between node i and node j, I is an identity matrix. For the case of $l_0 = 0$ (i.e., coincident nodes)

$$\frac{\partial f}{\partial x} = -kI$$

This is the case for the pilot node (node i) and the internal node (node j).

Additionally, values of the stiffness matrix of the numerical spring are so determined that physical characteristics of the model are kept within a tolerance. Physical characteristics can be relative movements/displacements between the pilot node and the internal node. The tolerance can be defined as a percentage of relative movements/displacements, for example, 0.1% of a representing length for translational displacement. The tolerance can also be defined as a value, for example, 0.001 radians for rotational displacement. Furthermore, the stiffness matrix of the numerical spring contains only diagonal terms. A numerical procedure (e.g., augmented Lagrangian method) is used for limiting relative movements/displacements between the pilot node and the internal node in a simulation, thereby assuring the numerical spring stiffness values are adequate to avoid ill-condition.

Augmented Lagrangian Method

Augmented Lagrangian methods are a certain class of algorithms for solving constrained optimization problems. They have similarities to penalty methods in that they replace a constrained optimization problem by a series of unconstrained problems and add a penalty term to the objective; the difference is that the augmented Lagrangian method adds yet another term, designed to mimic a Lagrange multiplier. The augmented Lagrangian is related to, but not identical with the method of Lagrange multipliers. Viewed differently, the unconstrained objective is the Lagrangian of the constrained problem, with an additional penalty term (the augmentation).

General method in augmented Lagrangian method is as follows:

Let us say we are solving the following constrained problem:

$$\min f(x)$$

subject to $$c_i(x) = 0, \forall i \in E$$

where E denotes the indices for equality constraints. This problem can be solved as a series of unconstrained minimization problems. For reference, we first list the kth step of the penalty method approach:

$$\min \phi_k(x) = f(x) + \mu_k \sum_{i \in E} c_i(x)^2$$

The penalty method solves this problem, then at the next iteration it re-solves the problem using a larger value of $\mu_k$ (and using the old solution as the initial guess or "warm-start").

The augmented Lagrangian method uses the following unconstrained objective:

$$\min \phi_k(x) = f(x) + \frac{\mu_k}{2} \sum_{i \in E} c_i(x)^2 + \lambda_i \sum_{i \in E} c_i(x)$$

and after each iteration, in addition to updating $\mu_k$, the variable $\lambda$ is also updated according to the rule $$\lambda_i \leftarrow \lambda_i + \mu_k c_i(x_k)$$

where $x_k$ is the solution to the unconstrained problem at the kth step, i.e., $$x_k = \operatorname{argmin} \phi_k(x)$$

The variable $\lambda$ is an estimate of the Lagrange multiplier, and the accuracy of this estimate improves at every step. The major advantage of the method is that unlike the penalty method, it is not necessary to take $\mu \to \infty$ in order to solve the original constrained problem. Instead, because of the presence of the Lagrange multiplier term, u can stay much smaller, thus avoiding ill-conditioning. Nevertheless, it is common in practical implementations to project multipliers estimates in a large bounded set (safeguards), avoiding numerical instabilities and leading to a strong theoretical convergence.

Figure 7A:
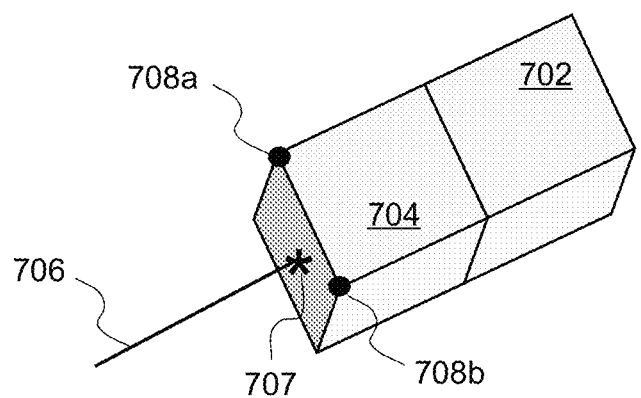
FIG. 7A shows an example rigid beam with a force-distributed constraint.

FIG. 7A shows an example of an over-constrained condition of a force-distributed constraint. In the example, there are two solid elements 702-704 connected to a rigid beam 706 at node 707. Node 707 is the pilot node of the force-distributed constraint, while nodes 708a-708b are the surface nodes on an outer surface of solid element 704. Since rigid beam 706 is a rigid constraint on the pilot node 707, node dependency in elimination method may be more difficult to resolve.

Figure 7B:
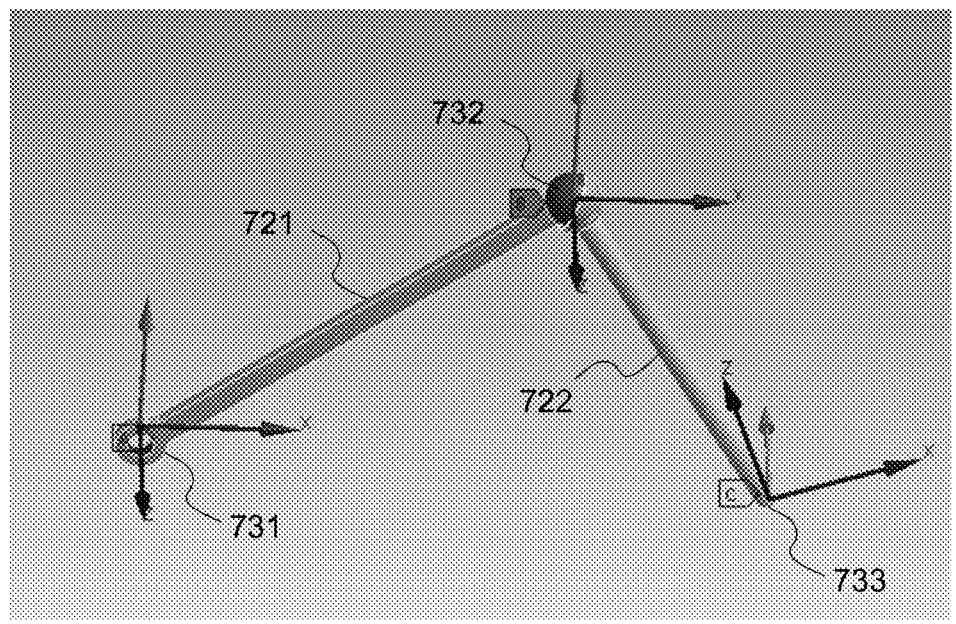
FIG. 7B shows an example structure with rigid constraints.

In multi-body dynamics (MBD), rigid constraint can be generally modelled as a linkage between two joint elements. FIG. 7B shows an MBD example of two rigid beams (i.e. rigid constraints): a first rigid beam 721 and a second rigid beam 722. Joint element A 731 and joint element B 732 are located at either end of the first rigid beam 721. Joint element B 732 and joint element C 733 are located at either end of the second rigid beam 722. Since joint element consisting a pair of nodes associated with Lagrange-multiplier method, node swapping technique cannot be applied in this MBD example. As a result, an over-constrained condition occurs.

Figure 8A:
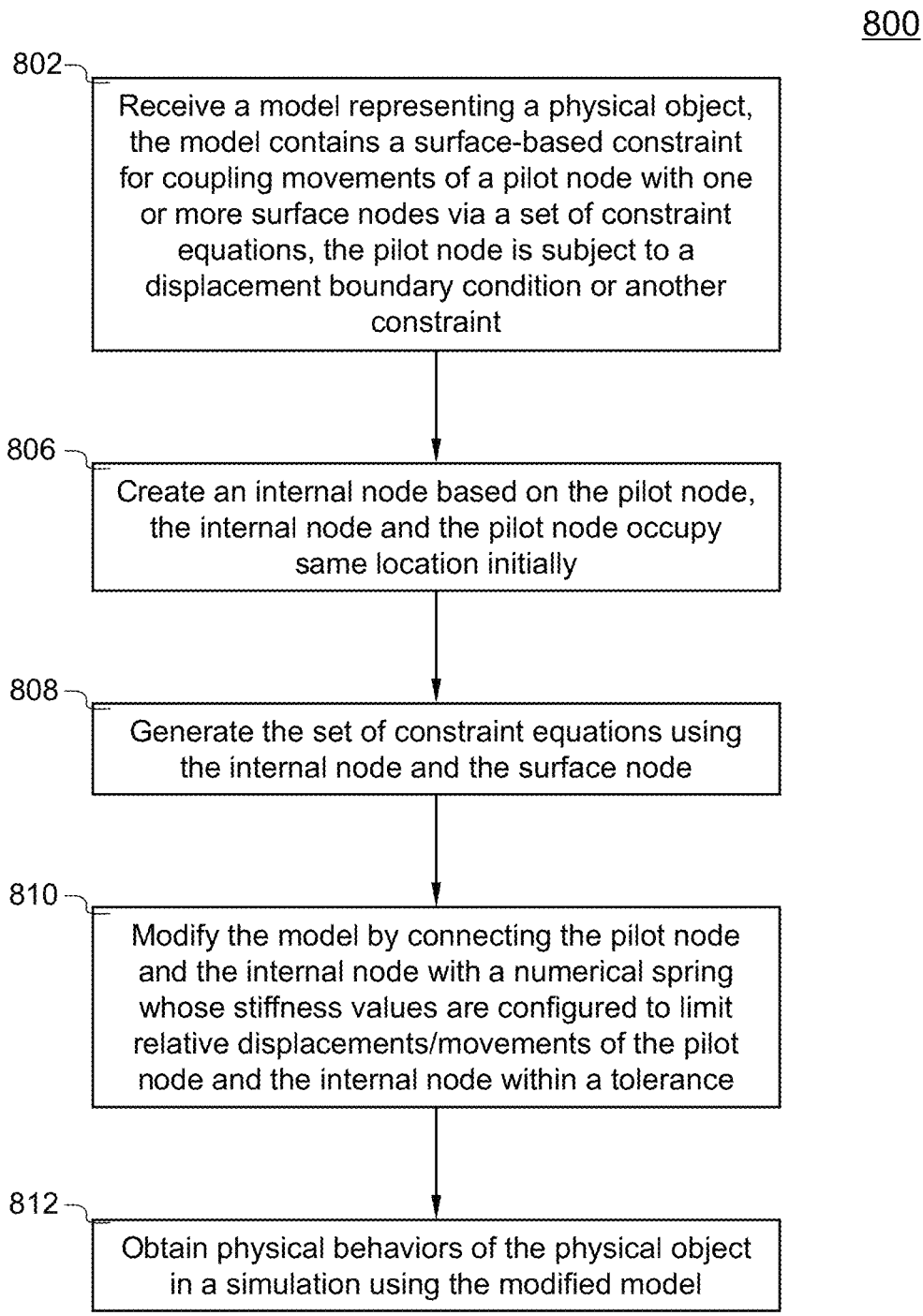
FIG. 8A is a flow diagram illustrating an example process of modelling surface-based constraints in finite element analysis.

FIG. 8A is a flow diagram illustrating an example process 800 of modelling a surface-based constraint in finite element analysis (FEA). Process 800 starts by receiving a model (e.g., an FEA model) representing a physical object (e.g., a structure) in a computer system (e.g., computer systems 900, 920 in FIGS. 9A-9B) at action 802. The model contains multiple nodes connected by various finite elements. Also contained in the model is a surface-based constraint for coupling displacements/movements of a pilot node with one or more surface nodes via a set of constraint equations. The pilot node and each of the surface nodes are two distinct nodes in the model. In other words, the pilot node can be any node in the model, and each of the surface nodes can also be any node in the model. The pilot node is subject to a condition that restricts node swapping for resolving node dependency in elimination method. For example, when the pilot node is subject to a displacement boundary condition and/or another constraint, there is high likelihood that the surface-based constraint may be over-constrained (i.e., node swapping technique cannot be performed). Next, at action 806, an internal node (or a pseudo node) is created based on the pilot node. The internal node and the pilot node occupy a same location initially. In other words, the internal node has the same coordinates of the pilot node. Then the set of constraint equations is generated using the internal node and the one or more surface nodes at action 808. Since the internal node and the pilot node are located at the same location, the set of constraint equations is the same as those between the pilot node and the one or more surface nodes.

Next, at action 810, the model is modified with the internal node and a numerical spring that connects the pilot node and the internal node. The numerical spring can be a two-dimensional (2D) spring for a simulation using a 2D model. In more general situations, the numerical spring is a three-dimensional (3D) spring with three components in translation and three components in rotation. Stiffness values of the numerical spring are so configured to limit or keep relative movements between the pilot node and the internal node within a tolerance. There are only diagonal terms in the stiffness matrix for the numerical spring. Values of the stiffness terms are determined by material properties and a representing size/length of one or more respectively connected structural finite elements to the pilot node and the one or more surface nodes. The modified model is used in a simulation to obtain physical behaviors of the physical model at action 812.

Figure 8B:
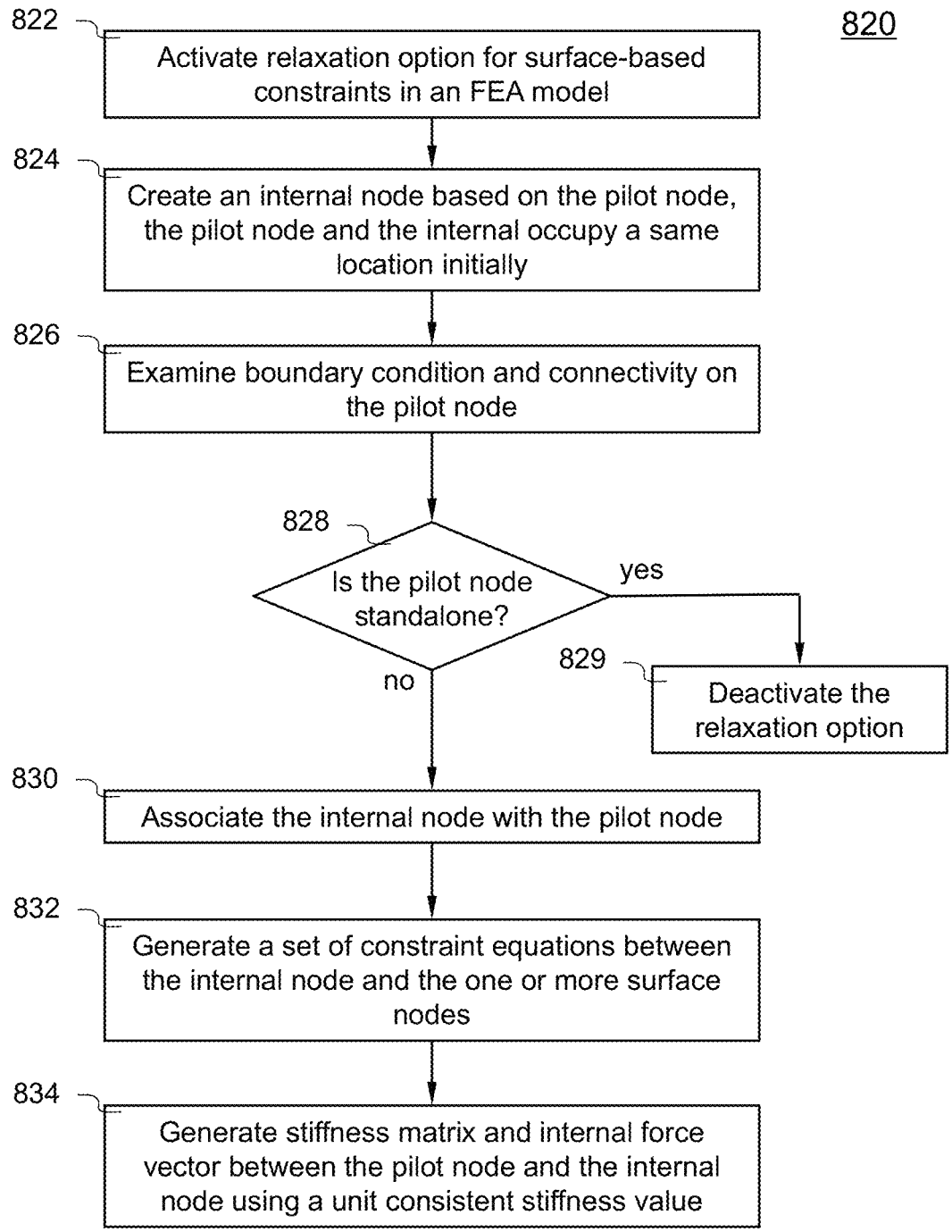
FIG. 8B is a flow diagram illustrating an alternative example process of modelling surface-based constraints in finite element analysis.

In another embodiment, another example process 820 of modelling a surface-based constraint in FEA is shown as a flow diagram in FIG. 8B. Process 820 starts at action 822 by activating a relaxation option for alleviating over-constrained conditions in a surface-based constraint in an FEA model. The FEA model was received in a computer system (e.g., computer systems 900, 920 in FIGS. 9A-9B). The surface-based constraint is used for coupling displacements/movements of a pilot node with one or more surface nodes via a set of constraint equations. At action 824, an internal node (or a pseudo node) is created based on the pilot node. The pilot node and the internal node occupy a same location initially. Then, at action 826, boundary conditions (e.g., displacement boundary condition) and connectivity (e.g., any connection to joint elements subject to Lagrange-multiplier method) to the pilot node are examined/determined. For rigid constraints, any overlapped connections between two constraints can be merged into one before examining action (see FIG. 8C for more details). Next, at decision 828, it is determined whether the pilot node is standalone. If so, process 820 follows the 'yes' branch to action 829 to deactivate the relaxation option (i.e., the model does not contain any over-constrained constraints). Otherwise, process 820 follows the 'no' branch to action 830 to associate the internal node with the pilot node. A set of constraint equations is generated between the internal node and the one or more surface nodes at action 832.

Finally, at action 834, stiffness matrix and internal force vector are generated between the pilot node and the internal node using a unit consistent stiffness value. The unit consistent stiffness value can be calculated using material properties and a representing size (length) of one or more structural finite elements respectively connected to the pilot node and the surface node. Material properties can include Young's modulus. The representing length can be the shortest dimension of the connected structural finite elements (e.g., solid elements, shell elements, beam elements). The unit consistent stiffness value may also be defined by a user.

The stiffness matrix representing a numerical spring is added to connect the pilot node and the internal node. Via stiffness matrix and internal force vector of the numerical spring, the modified model can be used for a simulation to obtain physical behaviors of a physical object.

Figure 8C:
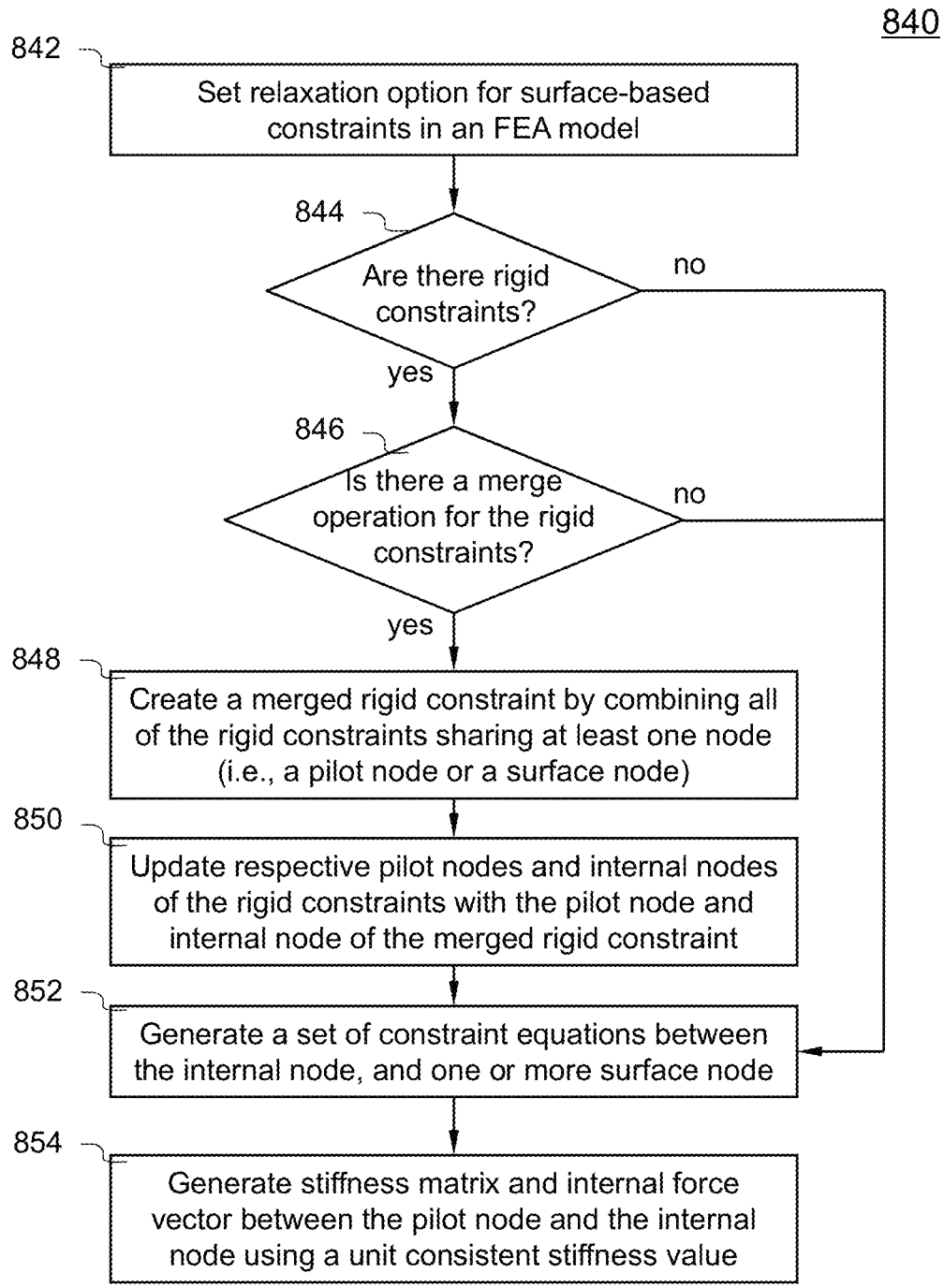
FIG. 8C is a flow diagram illustrating an example process of merging rigid constraints in finite element analysis.

FIG. 8C is a flow diagram illustrating an example process 840 of modelling merged rigid constraints in FEA. Process 840 starts at action 842 by activating a relaxation option for alleviating over-constrained conditions in a surface-based constraint in an FEA model. The FEA model is received in a computer system (e.g., computer systems 900, 920 in FIGS. 9A-9B). The surface-based constraint is used for coupling displacements/movements of a pilot node with one or more surface nodes via a set of constraint equations. Next, at decision 844, it is determined whether there are more than one rigid constraints. If not, process 840 follows the 'no' branch to action 852 for generating a set of constraint equations in a normal process. Otherwise, at decision 846, it is determined if a merging operation is activated/desired. If not, again process 840 following the 'no' branch to action 852 for generating a set of constraint equations normally. Otherwise, process 840 follows the 'yes' branch to action 848 to create a merged rigid constraint by combining all rigid constraints sharing any node (i.e., either pilot or surface node). At action 850, the respective pilot nodes and internal nodes are updated by using the pilot node and the internal node of the merged rigid constraint. Next, at action 852, a set of constraint equations is generated between the internal node, and one or more surface nodes of the merged rigid constraint. In other words, the merged rigid constraint is a "super" surface-based constraint with one pilot node and one associated internal node. Finally, at action 854, stiffness matrix and internal force vector of a numerical spring are generated. The numerical spring is added between the pilot node and the internal node of the merged rigid constraint using a unit consistent stiffness value. The unit consistent stiffness value can be calculated using material properties and a representing size (length) of one or more structural elements respectively connected to the pilot node and to the surface node. The unit consistent stiffness value may also be defined by a user.

Figure 8D:
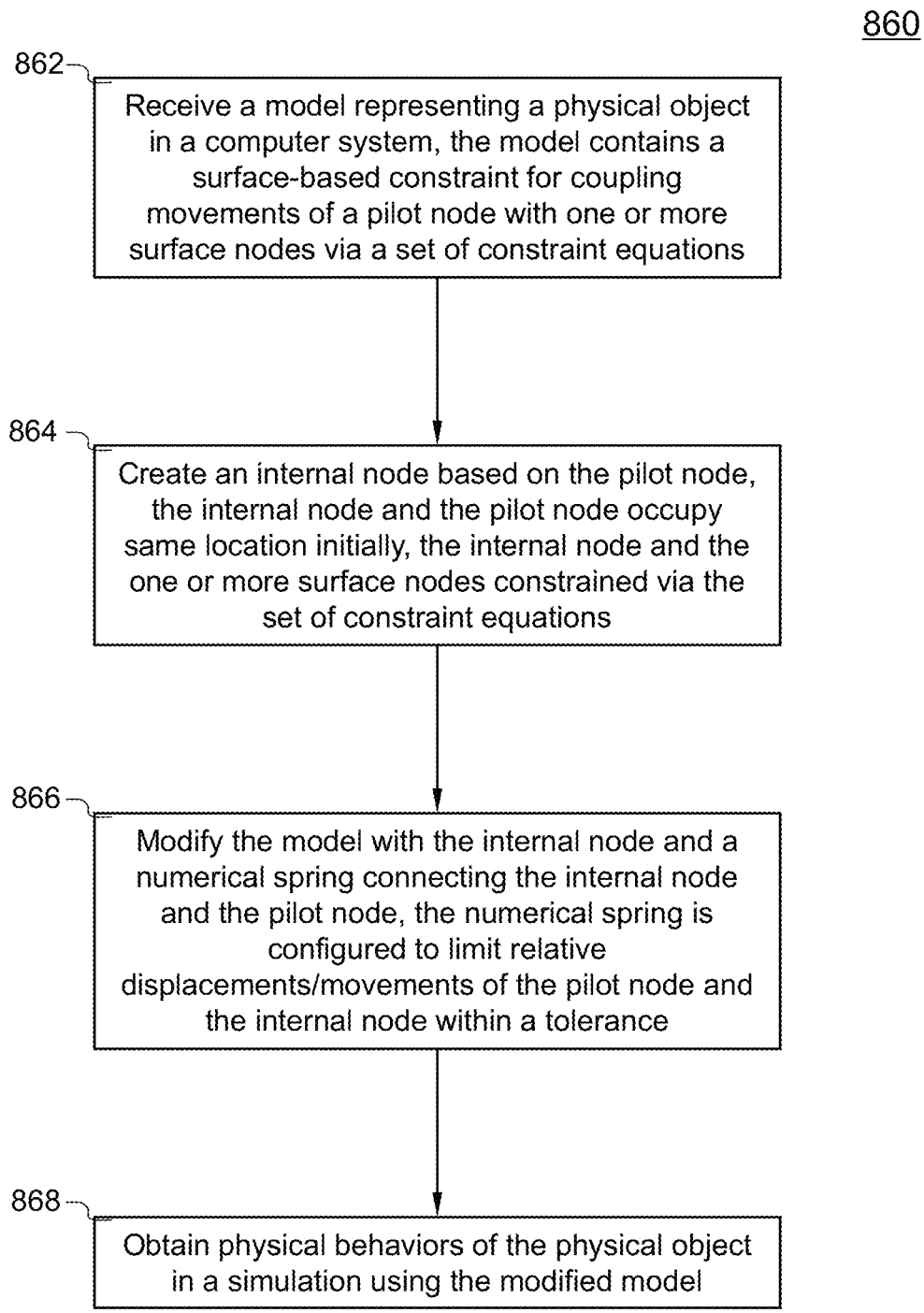
FIG. 8D is a flow diagram illustrating another alternative example process of modelling surface-based constraints in finite element analysis.

FIG. 8D is a flow diagram illustrating another alternative example process 860 of modelling a surface-based constraint in finite element analysis (FEA). Process 860 starts by receiving a model (e.g., an FEA model) representing a physical object (e.g., a structure) in a computer system (e.g., computer systems 900, 920 in FIGS. 9A-9B) at action 862.

The model contains multiple nodes connected by various finite elements. Also contained in the model is a surface-based constraint for coupling displacements/movements of a pilot node with one or more surface nodes via a set of constraint equations. The pilot node and each of the surface nodes are two distinct nodes in the model. In other words, the pilot node can be any node in the model. Similarly, each surface node can be any node other than the pilot node in the model.

Next, at action 864, an internal node (or a pseudo node) is created based on the pilot node. The internal node and the pilot node occupy a same location initially. In other words, the internal node has the same coordinates of the pilot node. Therefore, displacements/movements between the internal node and one or more surface nodes are constrained via the set of constraint equations. Since the internal node and the pilot node are located at the same location initially, the set of constraint equations is initially the same as those between the pilot node and the one or more surface nodes if there is no internal node.

Next, at action 866, the model is modified with the internal node and a numerical spring that connects the internal node and the pilot node. The numerical spring can be a two-dimensional (2D) spring for a simulation using a 2D model. In more general instances, the numerical spring is a three-dimensional (3D) spring with three components in translation and three components in rotation. Stiffness values of the numerical spring are so configured to limit or keep relative movements between the pilot node and the internal node within a tolerance. The tolerance can be predefined internally in the software or by user. There are only diagonal terms in the stiffness matrix for the numerical spring. Values of the stiffness terms are determined by material properties and a representing size/length of one or more respectively connected structural finite elements to the pilot node and the one or more surface nodes. The modified model is used in a simulation to obtain physical behaviors of the physical model at action 868. The simulation further includes performing elimination method to resolve node dependency based on node swapping. The node swapping can be restricted by a boundary condition associated with a node, for example, a displacement boundary condition on a node (e.g., pilot node, surface node). The node swapping can also be restricted by another constraint imposed on a node, for example, a displacement constraint is applied on a node of a joint element, which is associated with Lagrange Multipliers.

The subject matter described herein may be implemented using any suitable processing system with any suitable combination of hardware, software and/or firmware, such as described below with reference to the non-limiting examples shown in FIGS. 9A-9D.

Figure 9A:
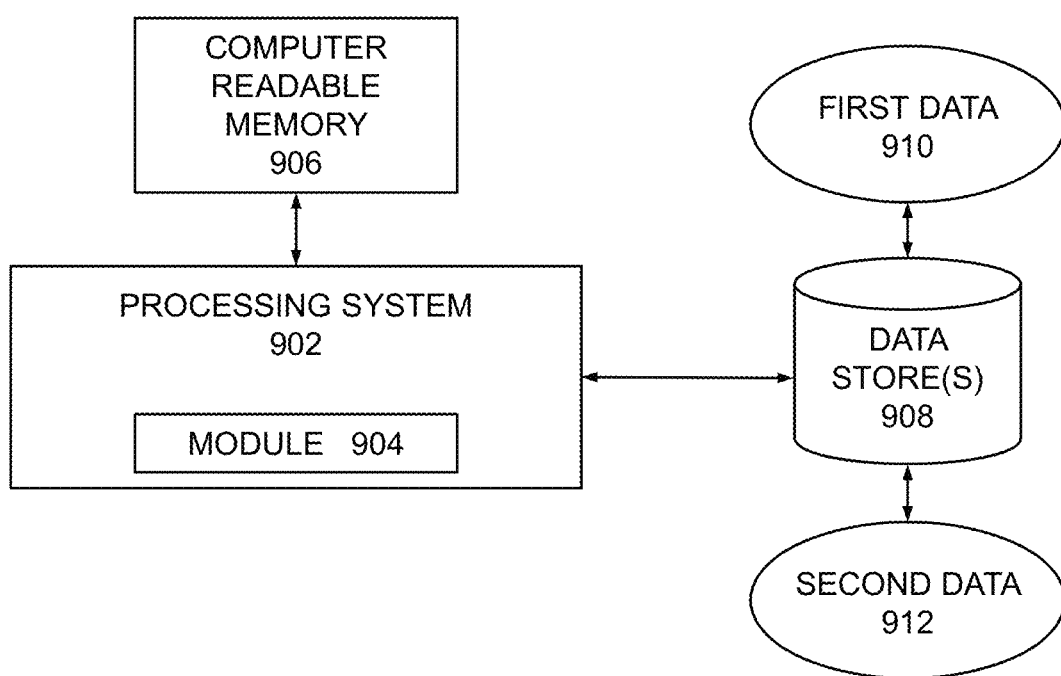
FIG. 9A is a block diagram showing an example system including a standalone computing architecture.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. One or more data stores 908 may contain first data 910 as well as second data 912.

Figure 9B:
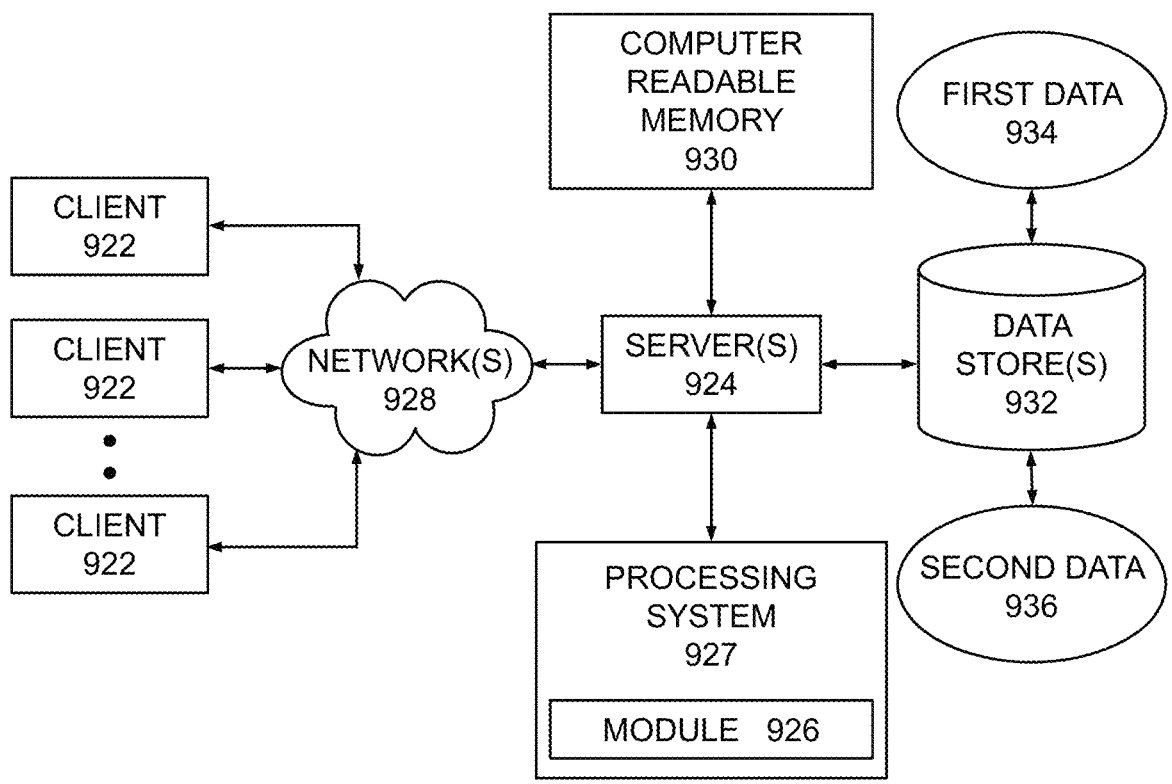
FIG. 9B is a block diagram showing an example system including a client-server computing architecture.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
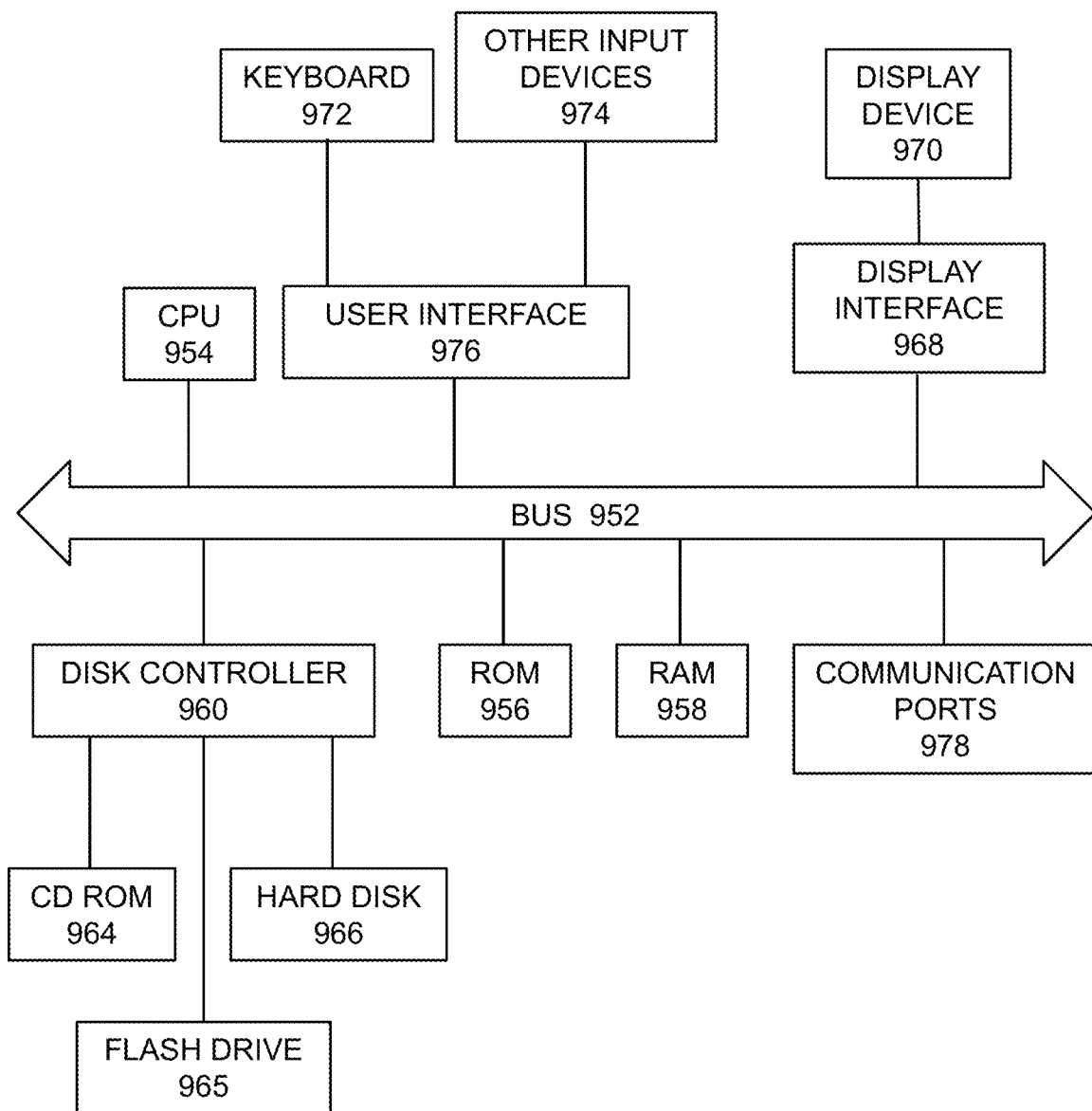
FIG. 9C is a function block diagram depicting salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphical, text, or alphanumeric format.

In addition to the standard computer-type components, the hardware may also include data input devices, such as a keyboard 972, or other input device 974, such as a microphone, remote control, pointer, mouse, touch screen, and/or joystick.

Figure 9D:
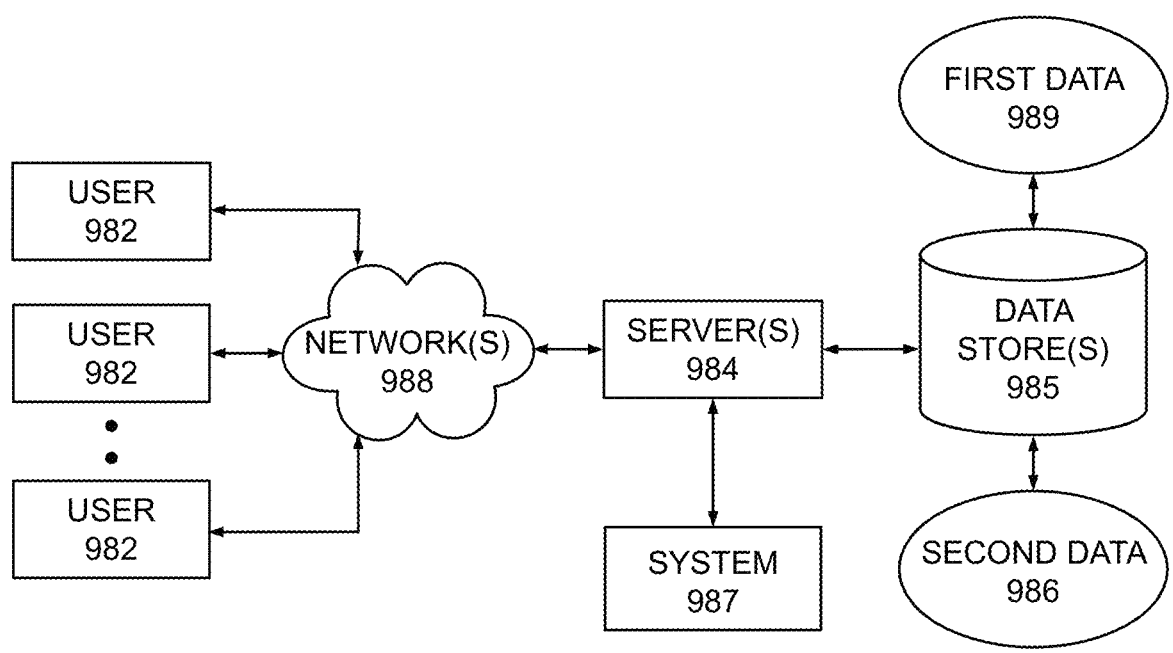
FIG. 9D is a block diagram illustrating an example computer-implemented environment.

FIG. 9D depicts a computer-implemented environment 980 wherein users 982 can interact with a system 987 hosted on one or more servers 984 through a network 988. The system 987 contains software operations or routines. The users 982 can interact with the system 987 through a number of ways, such as over one or more networks 988. One or more servers 984 accessible through the network(s) 988 can host the system 987. The processing system 987 has access to a non-transitory computer-readable memory in addition to one or more data stores 985. The one or more data stores 985 may contain a first data 989 as well as a second data 986. It should be understood that the system 987 could also be provided on a stand-alone computer for access by a user.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "up", and "down" are intended to provide relative positions/locations for the purposes of description, and are not intended to designate an absolute frame of reference. Further, the order of blocks in process flowcharts or flow diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method for resolving over-constraint conditions comprising:
   receiving a model representing a physical object, the model containing a first node, a second node, and a constraint for coupling movements between the first node and the second node via a set of constraint equations, wherein the first node is configured as a pilot node, the second node is located on a surface of the model, and the constraint is configured as a surface-based constraint;
   determining whether an over-constrained condition exists based on whether the first node or the second node are subject to at least one other surface-based constraint;
   where the over-constrained condition exists, relaxing one or more surface-based constraints by:
   creating a third node based on the first node, the third node and the second node constrained via the set of constraint equations; and
   modifying the model with the third node and a numerical spring, the first node and the third node connected with the numerical spring, the numerical spring limiting relative movements between the first node and the third node within a tolerance; and
   simulating physical behaviors of the physical object based on the modified model.

2. The method of claim 1, wherein the simulating physical behaviors of the physical object comprises performing elimination method to resolve node dependency based on node swapping.

3. The method of claim 2, wherein the node swapping is restricted by a boundary condition associated with a node.

4. The method of claim 2, wherein the node swapping is restricted by a displacement constraint imposed on a node.

5. The method of claim 4, wherein the node belongs to a joint element and the displacement constraint is associated with Lagrange Multipliers.

6. The method of claim 1, wherein the surface comprises a flat surface.

7. The method of claim 1, wherein the surface comprises a curved surface.

8. The method of claim 1, wherein the constraint comprises a rigid constraint.

9. The method of claim 1, wherein the constraint comprises a force-distributed constraint.

10. The method of claim 1, wherein the model comprises a finite element analysis model having multiple finite elements, wherein the numerical spring is represented by stiffness values based on material properties and a representing length of one or more finite elements respectively connected to the first node and the second node.

11. The method of claim 10, wherein the material properties comprise Young's modulus.

12. The method of claim 10, wherein the representing length comprises a shortest dimension of the one or more connected finite elements.

13. The method of claim 10, wherein the stiffness values are adjusted with a numerical procedure during the simulating the physical behaviors.

14. The method of claim 13, wherein the numerical procedure comprises augmented Lagrangian method.

15. The method of claim 1, wherein the third node comprises an internal node.

16. The method of claim 15, wherein the third node and the first node occupy a same location initially.

17. A system comprising:
a memory storing instructions;
one or more processors coupled to the memory, the one or more processors executing the instructions from the memory to perform a method for resolving over-constraint conditions comprises:
  receiving a model representing a physical object, the model containing a first node, a second node, and a constraint for coupling movements between the first node and the second node via a set of constraint equations, wherein the first node is configured as a pilot node, the second node is located on a surface of the model, and the constraint is configured as a surface-based constraint;
  determining whether an over-constrained condition exists based on whether the first node or the second node are subject to at least one other surface-based constraint;
  where the over-constrained condition exists, relaxing one or more surface-based constraints by:
    creating a third node based on the first node, the third node and the second node constrained via the set of constraint equations; and
    modifying the model with the third node and a numerical spring, the first node and the third node connected with the numerical spring, the numerical spring limiting relative movements between the first node and the third node within a tolerance; and
  simulating physical behaviors of the physical object based on the modified model.

18. A non-transitory computer-readable medium storing instructions for commanding one or more processors to perform a method for resolving over-constraint conditions comprising:
  receiving a model representing a physical object, the model containing a first node, a second node, and a constraint for coupling movements between the first node and the second node via a set of constraint equations, wherein the first node is configured as a pilot node, the second node is located on a surface of the model, and the constraint is configured as a surface-based constraint;
  determining whether an over-constrained condition exists based on whether the first node or the second node are subject to at least one other surface-based constraint;
  where the over-constrained condition exists, relaxing one or more surface-based constraints by:
    creating a third node based on the first node, the third node and the second node constrained via the set of constraint equations; and
    modifying the model with the third node and a numerical spring, the first node and the third node connected with the numerical spring, the numerical spring limiting relative movements between the first node and the third node within a tolerance; and
  simulating physical behaviors of the physical object based on the modified model.

* * * * *